Dec. 19, 1967  P. N. WELCH  3,358,557
OPTICAL CHART AND METHOD
Filed Oct. 28, 1965  3 Sheets-Sheet 3

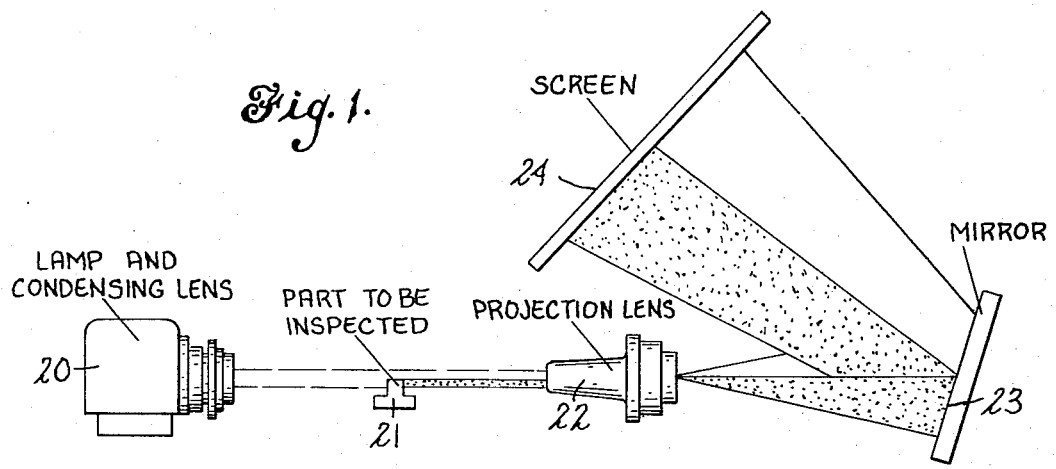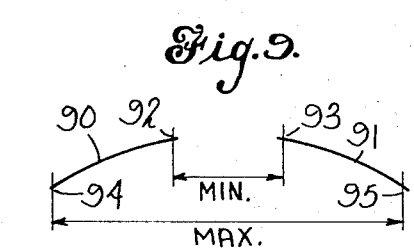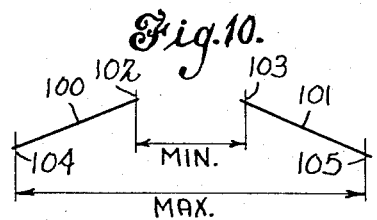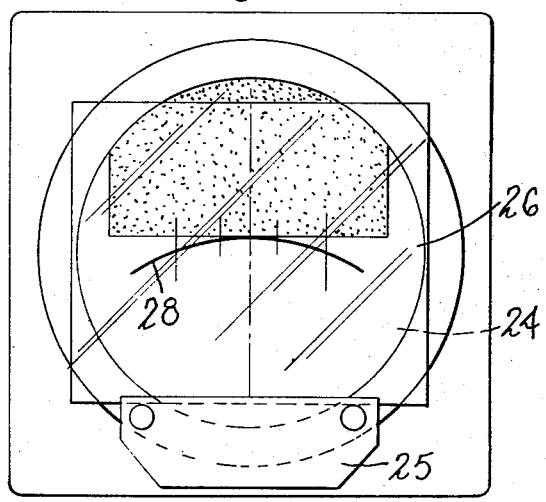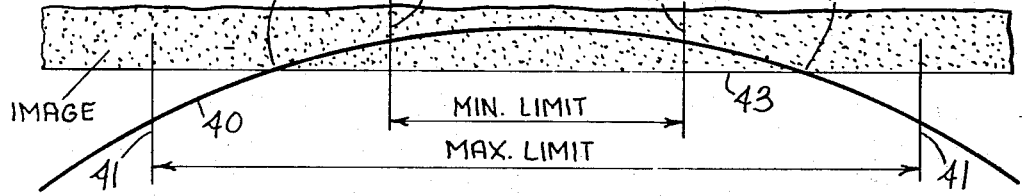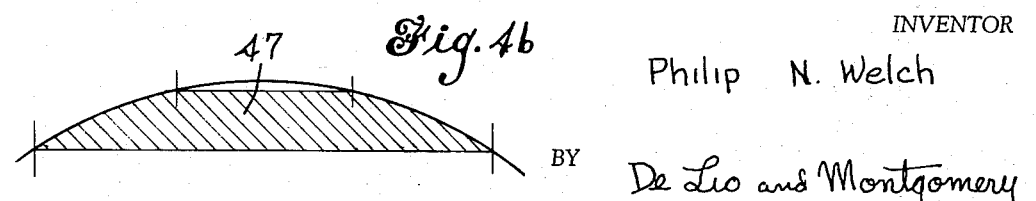

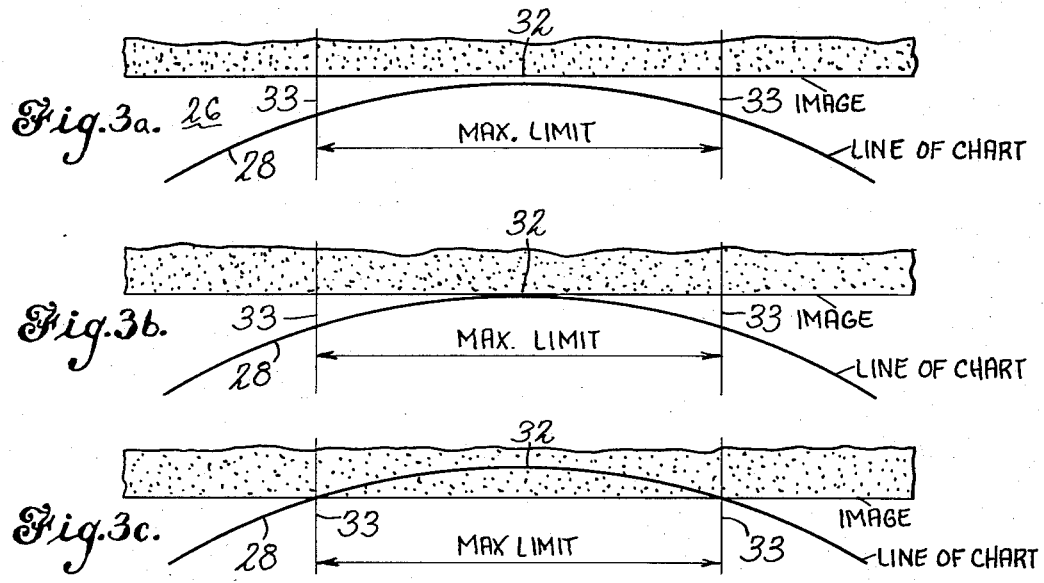
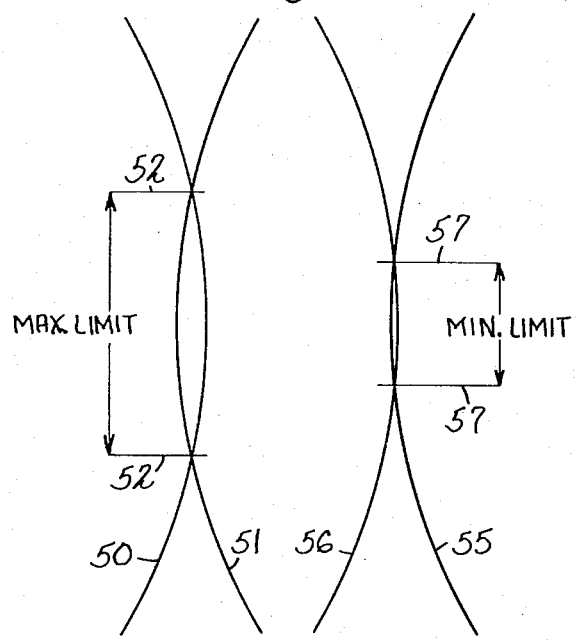

$$R = \frac{C^2 + 4H^2}{8H}$$

INVENTOR
Philip N. Welch

BY De Lio and Montgomery
ATTORNEYS

United States Patent Office

3,358,557
Patented Dec. 19, 1967

3,358,557
OPTICAL CHART AND METHOD
Philip N. Welch, Chester, Vt., assignor to Textron, Inc., Providence, R.I., a corporation of Rhode Island
Filed Oct. 28, 1965, Ser. No. 505,529
9 Claims. (Cl. 88—24)

ABSTRACT OF THE DISCLOSURE

An apparatus for the inspection and measurement of structural parts, comprising a translucent screen, means for supporting a part to be inspected, means for projecting an image indicative of the shape of the part on the translucent screen, and a translucent chart positioned in front of the screen, said translucent chart having at least one visible curved geometric two-dimensional open figure on a surface thereof and a pair of geometric figure limit markings positioned on a surface of the chart and intersecting the open figure, said limit markings being straight lines and being at an angle of substantially 90° with respect to an imaginary straight line passing between the intersection of the limit markings and the geometric figure, whereby conformance and nonconformance of the image of the part with respect to the geometric figure is visibly indicated and wherein close tolerances of the image of the part with respect to the open geometric figure are indicated by the intersections of the image of the part with the curved geometric surface and the limit markings.

---

This invention relates to optical comparators for the inspection and measurement of structural parts and objects and more particularly to an improved comparator chart and method for determining the limits of objects whose shadows have been magnified and projected onto a screen.

In the well known types of optical comparators, a beam of light is directed upon a part to be inspected. A projecting and magnifying lens system and a cooperating mirror provide a magnified shadow of the part on a viewing screen of translucent material such as a sheet of ground glass. The part passes inspection when the outline of the magnified shadow and a master chart outline coincide in a predetermined manner.

The prior art has disclosed many types of chart outlines usable for determining limits of projected parts. For example, concentric circles and parallel lines have long been used to measure a part. As long as the magnified shadow representing the part falls between two concentric circles or two parallel lines, the part is deemed to have passed inspection. The use of concentric circle or parallel line charts not only results in a great deal of operator fatigue, but also the accuracy of measurement is limited since the outside acceptable limits are determined by observing that the shadow line is tangent to a circle or parallel to a line.

In view of the foregoing, a new and improved optical comparator chart outline and method was required. The new chart outline must not only reduce operator fatigue but must also provide a more accurate indication that tolerance limits have been met. Furthermore, a new chart outline providing a geometric advantage was required in order to reduce the degree of magnification required by present comparator systems.

Accordingly, it is an object of this invention to provide a new and improved comparator chart outline.

Another object of the invention is to provide a new and improved method for inspecting a part or object.

Another object of the invention is to provide a new and improved chart outline providing geometric multiplication.

A further object of the invention is to provide a new and improved tool for measuring limits of parts wherein the limits are determined by observing the intersection of a part produced shadow with an arc or two intersecting straight lines.

Still other objects and advantages of the invention will in part be obvious and will in part be apparent from the specification.

The invention accordingly comprises the several steps and the relation of one or more of such steps with respect to each of the others and the article possessing the features, properties and relation of elements which are exemplified in the following detailed disclosure and the scope of the invention will be indicated in the claims.

For a fuller understanding of the nature and objects of the invention reference is had to the following description taken in connection with the accompanying drawings, in which:

FIG. 1 is a schematic diagram of the main portions of an optical comparator arranged for operation with the chart of the invention;

FIG. 2 is a plan view of an optical comparator screen and means for mounting a chart according to the invention adjacent the screen;

FIG. 3a is a picture as seen on the comparator screen through the chart of the invention if the part being gaged is undersized;

FIG. 3b is a picture as seen on the comparator screen through the chart of the invention if the part being gaged meets the minimum size limit;

FIG. 3c is a picture as seen on the comparator screen through the chart of the invention if the part being gaged is of a size which falls between the minimum and maximum limits;

FIG. 4a is a picture as seen on the comparator screen through the chart of the invention if the part being gaged is of a size such that its surface produces a chord which intersects an arc of the chart between minimum and maximum tolerance limits;

FIG. 4b is a diagram illustrating the area in which the workpiece image must fall in order to be of an acceptable tolerance;

FIG. 5 is a picture as seen on the comparator screen showing maximum and minimum limits expressed as the chord formed by the intersection of the two circular arcs according to the invention;

FIG. 9 is a diagram illustrating an alternate embodiment of a chart according to the invention; and FIG. 10 is a diagram illustrating another alternate embodiment of a chart according to the invention.

Figure 6:
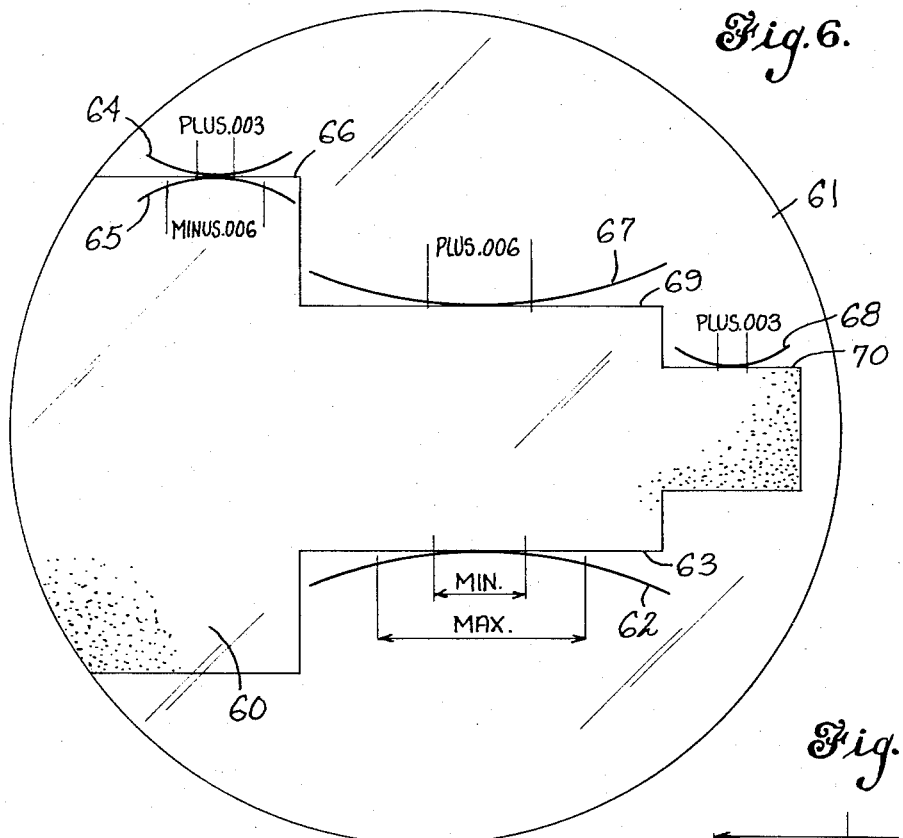
FIG. 6 is a view of a comparator screen showing an image of a part and various types of chart limit lines according to the invention.

Referring to FIG. 1, there is shown a comparator system for displaying an enlarged or magnified image of the contour of the work or part to be inspected. A parallel beam of light, provided by the combination of a lamp and condensing lens at 20, is directed at a part 21 which is held by a fixture (not shown). The placement of the part outline in the parallel light beam causes a shadow outline to be projected. This outline is then magnified by a projection lens and magnifying lens system shown at 22 which, in turn, throws a magnified shadow on a mirror 23 inclined so as to cause the image to be projected on a screen 24. This screen is of translucent material, such that an operator viewing the screen is able to see a shadow and light areas.

In FIG. 2 there is shown a diagram of the screen 24 and a rail 25 for holding a chart 26 according to the invention. The chart 26 is of a translucent material, such as ground glass, plastic or clear glass, etc., having an opaque line 28 in the shape of an arc. The shadow area as shown on the screen through the chart 26 represents the outline of the work or part to be gaged.

It has been discovered by applicant that when the image of a projected workpiece having a substantially straight side is observed inside the tangent point of an arc, its position may be determined more accurately by observing the length of a chord, made by the image. The length of the chord is a function of the height of the chord and the radius of the arc. Since the length of the chord changes rapidly with changes in the chord height and since the chord height is a direct function of the part size, a geometric leverage or multiplication is therefore provided. By observing the intersection of the chord formed by the image with an arc, it is easily determinable whether the workpiece is of a dimension which falls between acceptable maximum and minimum limits.

For an example of this technique, reference is now had to FIGS. 3a–3c, wherein a part or workpiece image is shown shaded and wherein the arc line 28 on chart 26 is positioned such that the dimension of the workpiece or part may be gaged. From FIG. 3a it may be observed that the part image lies outside the arc tangency point 32. Accordingly, the part does not meet the minimum limits. Also shown in FIG. 3a are maximum limit lines 33 which intersect arc 28 such that the chord formed by the image of a part may be inspected.

In FIG. 3b there is shown an image of a workpiece which is indicated as being tangent to the arc and, therefore, within the minimum limits specified for the workpiece. In FIG. 3c there is disclosed a workpiece or part of a dimension such that it falls between the outermost portion of the arc shown at 32 and the maximum limit lines 33.

From FIGS. 3a–3c, it is observed that in order for a part to pass inspection, the image must lie between the point 32 and the point 33. This may be easily determined since an indication of the length of the workpiece is provided by two lines crossing, that is, the line of the arc with the line formed by the image. This is significantly different from the prior art charts wherein the workpiece limits are determined by noting the position of the part between two concentric circles or between two parallel lines. A precise indication is not obtained with concentric circle or parallel line systems, inasmuch as the outer limits (maximum and minimum) are determined by observing if the image is tangential to one of the concentric circles or parallel lines.

Referring now to FIGS. 4a and 4b, an arc 40 on a chart is provided with maximum and minimum limit markers shown at 41 and 42, respectively. The image is shown as providing a line 43 which is noted as intersecting the arc 40 at point 45. Since point 45 lies between points 41 and 42 on the arc, the workpiece is deemed to be within the correct tolerance limits. From FIG. 4b, it is to be noted that as long as the image falls within the area shown shaded at 47, the workpiece dimension being gaged lies between the maximum and minimum limits.

Referring now to FIG. 5, there is shown a diagram illustrating maximum and minimum limits expressed as the chord formed by the intersection of two circular arcs. On the left side of this figure there is shown the measurement of a circular image 50 by an arc line 51 of a chart. The maximum limit for the workpiece is indicated by the lines 52 intersecting the arc line 51. On the right side of this figure a circular workpiece line is shown at 55 and a chart line is shown at 56 having marker lines 57 indicating the minimum limits for the workpiece. Again, this shows the use of the intersection of two lines to indicate the limits of a workpiece rather than relying on the tangency formed by a workpiece image with concentric circles or parallel lines.

Referring to FIG. 6, there is shown the image of the workpiece 60 on a comparator screen. Mounted on the face of the screen is a chart 61 having a plurality of tolerance lines positioned to gage the irregularly shaped workpiece. At the bottom of the chart an arc 62 of the type disclosed in FIG. 4a is utilized to determine the maximum-minimum limits of the image of the workpiece at 63. In the upper left portion of the diagram there is shown two arcs 64 and 65 for gaging maximum and minimum limits, and the workpiece portion 66. In the upper right portion of this figure is disclosed two other arcs 67 and 68 for measuring portions 69 and 70 of the workpiece. As can be observed from this figure, the arc lines formed on the chart may be positioned in various manners to gage a workpiece, as long as the arc lines are positioned on the chart such that when used in conjunction with the comparator screen the arcs will intersect the contour to be gaged.

Figure 7:
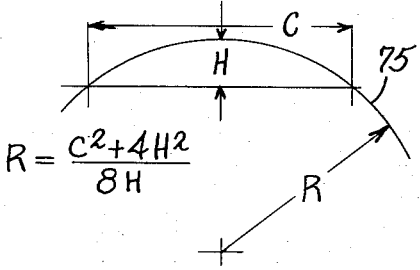
FIG. 7 is a diagram illustrating the relation between the chord length, chord height and the radius of an arc in order to obtain a particular geometric multiplication factor.

Referring now to FIG. 7, there is shown an arc 75 which is derived from the formula $$R = \frac{C^2 + 4H^2}{8H}$$

wherein C is defined at the desired chord length, H defines the height of the arc, and R is equal to the radius of the arc. The arc is constructed on the chart so as to provide a particular multiplication factor, that is, the relationship of H to C at the maximum limit is such that a particular amount of multiplication is obtained. To illustrate the relationship of H, C and R for various multiplication factors, there are provided below, tables setting forth the respective dimensions of H, C and R for multiplication factors of 50, 100 and 150. The numbers may be in terms of inches or centimeters, as the case may be. It is to be understood that other multiplication factors may be utilized without departing from the scope

MULTIPLIER 50X

| | | | | | | |
|---|---|---|---|---|---|---|
| H | .005 | .010 | .015 | .020 | .025 | .030 |
| C | .250 | .500 | .750 | 1.000 | 1.250 | 1.500 |
| R | 1.5650 | 3.1300 | 4.695 | 6.2600 | 7.825 | 9.390 |

MULTIPLIER 100X

| | | | | | | |
|---|---|---|---|---|---|---|
| H | .005 | .010 | .015 | .020 | .025 | .030 |
| C | .500 | 1.000 | 1.500 | 2.000 | 2.500 | 3.000 |
| R | 6.2525 | 12.5050 | 18.7575 | 25.010 | 31.2625 | 37.5150 |

MULTIPLIER 150X

| | | | |
|---|---|---|---|
| H | .005 | .010 | .015 |
| C | .750 | 1.500 | 2.250 |
| R | 14.065 | 28.130 | 42.1950 |

From the foregoing tables, it is to be noted that for a multiplication factor of 100, the length of the chord formed at the maximum limit points is one hundred times greater than the height of the chord.

Figure 8:
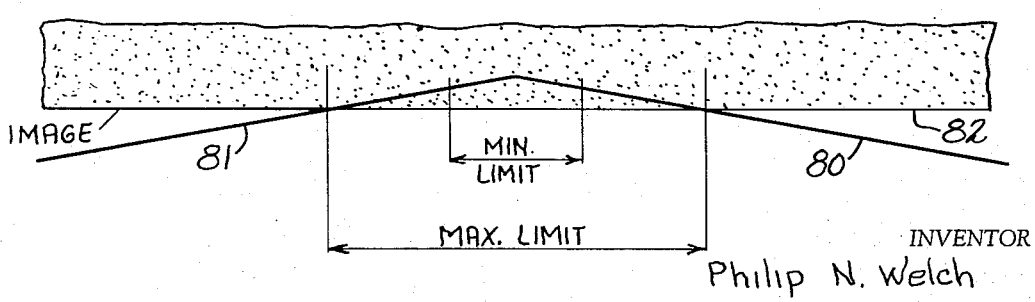
FIG. 8 is a picture as seen on the comparator screen through the chart, showing maximum and minimum limits expressed as the hypotenuse of an obtuse angled isosceles triangle according to the invention.

Referring now to FIG. 8, there is disclosed an open geometric irregularly-shaped form such as two intersecting lines 80 and 81, which are positioned on a chart such that an image defined by the shadow line 82 may be inspected. In this figure it is preferable that lines 80 and 81 intersect each other at an obtuse angle because of the geometric multiplication factor advantage obtained. It is to be understood that although an obtuse angle is shown between the lines 80 and 81, the angle could be acute and still provide some degree of multiplication. Although there is no one preferable method of forming the open geometric figures on the charts, they may be formed by etching, printing, embossing, or any other well known method.

The diagram of FIG. 9 illustrates an alternate embodiment of a chart having two non-parallel open geometric figures, 90 and 91, suitable for inspecting parts according to the invention. The figures are in the form of arcs which preferably have the same radius and are preferably generated from the same center point. Positioned along the lines 90 and 91 are minimum limit markings 92 and 93, respectively, and maximum limit markings 94 and 95, respectively. Although the arcs are shown as concave, portions of convex figures may also be used.

Referring now to FIG. 10, another alternate embodiment of a chart is disclosed having two non-parallel open geometric figures 100 and 101, suitable for inspecting parts according to the invention. The figures are in the form of straight lines. Positioned on lines 100 and 101 are minimum limit markings 102 and 103, respectively, and maximum limit markings 104 and 104, respectively.

In all of the embodiments shown, it is to be noted that a chord produced by an end of part image which intersects the chart line or lines, as the case may be, increases in size as the dimension of the part increases. It is additionally to be noted that the length of the chord produced by the image increases at a more rapid rate than the dimension of the part-generated image. Thus a geometric multiplication factor is provided which permits more accurate inspection of the parts being measured.

It will thus be seen that the objects set forth above, among those made apparent from the preceding description, are efficiently attained and since certain changes may be made in carrying out the above method and in the construction set forth without departing from the spirit and scope of the invention, it is intended that all matter contained in the foregoing description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An apparatus for the inspection and measurement of structural parts, comprising a translucent screen, means for supporting a part to be inspected, means for projecting an image indicative of the shape of the part on the translucent screen, and a translucent chart positioned in front of the screen, said translucent chart having at least one visible curved geometric two-dimensional open figure on a surface thereof and a pair of geometric figure limit markings positioned on a surface of the chart and intersecting the open figure, said limit markings being straight lines and being at an angle of substantially 90° with respect to an imaginary straight line passing between the intersection of the limit markings and the geometric figure, whereby conformance and non-conformance of the image of the part with respect to the geometric figure is visibly indicated and wherein close tolerances of the image of the part with respect to the open geometric figure are indicated by the intersections of the image of part with the curved geometric surface and the limit markings.

2. An apparatus in accordance with claim 1, wherein the geometric open figure is an arc.

3. An apparatus in accordance with claim 1, wherein the geometric open figure is two intersecting straight lines.

4. An apparatus in accordance with claim 2, wherein the radius R of the arc is equal to $$\frac{C^2+4H^2}{8H}$$

wherein C is the length of a chord intersecting the arc at maximum limit points positioned on the arc and wherein H is the height of said chord.

5. An apparatus in accordance with claim 1, wherein there are provided two pairs of straight line limit markings, each of said pairs oppositely positioned with respect to the other of said pairs, one of said pairs indicating minimum acceptable limits and the other of said pairs indicating maximum acceptable limits, and wherein each pair of limit markings intersects the geometric figure such that the limit markings of each pair are at an angle of substantially 90° with respect to an imaginary line passing between the intersection of the limit markings and the open geometric figure.

6. An apparatus for the inspection and measurement of structural parts, comprising a translucent screen, means for supporting a part to be inspected, means for projecting an image indicative of the shape of the part on the translucent screen, and a translucent chart positioned in front of the screen, said translucent chart having at least two visible non-parallel two-dimensional open geometric figures on a surface thereof and a pair of straight line limit markings on said surface, one limit marking of each pair intersecting a different one of the geometric figures, said limit markings being at an angle of substantially 90° with respect to an imaginary straight line passing between the intersection of the limit markings and geometric figures, whereby the image of the part, the limit markings and the figures provide a substantially three-way intersction in cases where the part is very close to the tolerance specified for the part.

7. An apparatus in accordance with claim 6, wherein the figures are arcs having the same radius and wherein the arcs are generated from the same center point.

8. An apparatus in accordance with claim 6, wherein the figures are straight lines.

9. An apparatus according to claim 6, in which there is provided a second pair of straight line limit markings, each limit marking of said second pair intersecting a different one of the geometric figures and said second pair of limit markings being at an angle of substantially 90° with respect to an imaginary straight line passing between the intersection of the second pair of limit markings and the geometric figures.

References Cited

UNITED STATES PATENTS

| 2,192,529 | 3/1940 | Thomas et al. | 88—24 |
| 2,483,355 | 10/1949 | Brennan | 88—24 |
| 2,949,057 | 8/1960 | Polidor | 88—24 |

NORTON ANSHER, *Primary Examiner.*

WINDHAM M. FRYE, *Assistant Examiner.*